US010990229B2

(12) United States Patent
Gogte et al.

(10) Patent No.: US 10,990,229 B2
(45) Date of Patent: Apr. 27, 2021

(54) RECTANGULAR TOUCH NODE DESIGN FOR METAL MESH ON-CELL TECHNOLOGY

(71) Applicant: Apple Inc., Cupertino, CA (US)

(72) Inventors: Ashray Vinayak Gogte, Sunnyvale, CA (US); Warren S. A. Rieutort-Louis, Cupertino, CA (US); Alexandre Gourevitch, San Jose, CA (US); Christophe Blondin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/530,955

(22) Filed: Aug. 2, 2019

(65) Prior Publication Data
US 2020/0042120 A1 Feb. 6, 2020

Related U.S. Application Data

(60) Provisional application No. 62/714,617, filed on Aug. 3, 2018.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ...... G06F 3/044; G06F 3/0412; G06F 3/0416; G06F 3/0443; G06F 3/0418; G06F 3/0448
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |

(Continued)

FOREIGN PATENT DOCUMENTS

| CN | 108054193 A | 5/2018 |
| CN | 108874228 A | 11/2018 |

(Continued)

OTHER PUBLICATIONS

International Search Report received for PCT Patent Application No. PCT/US2019/45009, dated Oct. 10, 2019, 4 pages.

(Continued)

*Primary Examiner* — Ibrahim A Khan
(74) *Attorney, Agent, or Firm* — Kubota & Basol LLP

(57) ABSTRACT

A touch sensor panel is disclosed. In some examples, the touch sensor panel includes drive electrodes and sense electrodes, wherein the drive electrodes and sense electrodes form touch nodes. In some examples, touch nodes include differently-sized drive and/or sense electrodes, and changes to the size or quantity of reference or floating electrodes disposed within the drive and/or sense electrodes are used to substantially balance the areas of the drive and/or sense electrodes in a given touch node.

20 Claims, 10 Drawing Sheets

(56) References Cited

U.S. PATENT DOCUMENTS

| | | | |
|---|---|---|---|
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 9,495,050 B1* | 11/2016 | Hoshtanar | G06F 3/0443 |
| 9,658,726 B2 | 5/2017 | Rowe et al. | |
| 9,684,417 B2* | 6/2017 | Lu | G06F 3/0448 |
| 2006/0197753 A1 | 9/2006 | Hotelling | |
| 2010/0079402 A1 | 4/2010 | Grunthaner et al. | |
| 2010/0309160 A1 | 12/2010 | Lin | |
| 2011/0007020 A1 | 1/2011 | Hong et al. | |
| 2011/0102361 A1 | 5/2011 | Philipp | |
| 2011/0157043 A1 | 6/2011 | Lai et al. | |
| 2012/0062250 A1* | 3/2012 | Kuo | G06F 3/041 324/686 |
| 2012/0268418 A1 | 10/2012 | Ishizaki et al. | |
| 2012/0327012 A1* | 12/2012 | Hoch | G06F 3/0446 345/174 |
| 2013/0100054 A1 | 4/2013 | Philipp | |
| 2013/0162596 A1 | 6/2013 | Kono et al. | |
| 2013/0181942 A1 | 7/2013 | Bulea et al. | |
| 2013/0222297 A1 | 8/2013 | Adachi | |
| 2013/0234734 A1* | 9/2013 | Iida | G01R 27/2605 324/661 |
| 2013/0257785 A1* | 10/2013 | Brown | G06F 3/044 345/174 |
| 2013/0278513 A1 | 10/2013 | Jang | |
| 2014/0078068 A1* | 3/2014 | Jones | G06F 3/0445 345/173 |
| 2014/0098304 A1* | 4/2014 | Kim | G06F 3/0446 349/12 |
| 2014/0225839 A1 | 8/2014 | Dunphy et al. | |
| 2014/0225859 A1* | 8/2014 | Badaye | G06F 3/0448 345/174 |
| 2014/0347319 A1* | 11/2014 | Lin | G06F 3/0445 345/174 |
| 2015/0028894 A1 | 1/2015 | Sleeman | |
| 2015/0286308 A1 | 10/2015 | Guard | |
| 2015/0331288 A1 | 11/2015 | Hsieh et al. | |
| 2016/0062499 A1 | 3/2016 | Pedder et al. | |
| 2016/0349890 A1 | 12/2016 | Weng et al. | |
| 2016/0357303 A1 | 12/2016 | Xie et al. | |
| 2017/0192568 A1 | 7/2017 | Kim et al. | |
| 2018/0157354 A1 | 6/2018 | Blondin et al. | |
| 2018/0348948 A1* | 12/2018 | Lee | G06F 3/0412 |
| 2019/0025955 A1* | 1/2019 | Vandermeijden | G06F 3/04817 |
| 2019/0050104 A1 | 2/2019 | Na et al. | |
| 2019/0064965 A1* | 2/2019 | Yoon | G06F 3/0445 |
| 2019/0179445 A1 | 6/2019 | Moon | |
| 2020/0012386 A1 | 1/2020 | Zhang et al. | |

FOREIGN PATENT DOCUMENTS

| | | |
|---|---|---|
| JP | 2000-163031 A | 6/2000 |
| JP | 2002-342033 A | 11/2002 |
| JP | 2016-1408 A | 1/2016 |
| KR | 10-2015-0046636 A | 4/2015 |
| WO | 2005/114369 A2 | 12/2005 |
| WO | 2005/114369 A3 | 1/2006 |

OTHER PUBLICATIONS

Extended European Search Report received for European Patent Application No. 15179799.0, dated Feb. 5, 2016, 6 pages.

Final Office Action received for U.S. Appl. No. 14/475,368, dated Feb. 9, 2017, 21 pages.

Non-Final Office Action received for U.S. Appl. No. 14/475,368, dated May 18, 2016, 17 pages.

Pre-Brief Appeal Conference Decision received for U.S. Appl. No. 14/475,368, dated Jul. 24, 2017, 2 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Extended European Search Report received for European Patent Application No. 20187192.8, dated Dec. 14, 2020, 11 pages.

* cited by examiner

RECTANGULAR TOUCH NODE DESIGN FOR METAL MESH ON-CELL TECHNOLOGY

CROSS REFERENCE TO RELATED APPLICATION

This application claims the benefit under 35 U.S.C. 119(e) of U.S. Provisional Patent Application No. 62/714,617, filed Aug. 3, 2018 the content of which is incorporated herein by reference in its entirety for all purposes.

FIELD OF THE DISCLOSURE

This relates generally to touch sensor panels, and more particularly to touch sensor panels having mixed-shape touch nodes containing drive electrodes, sense electrodes, ground electrodes or floating electrodes and techniques for achieving better touch linearity by varying the size and the shape of these electrodes.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Examples of the disclosure are directed to various single layer touch sensor panel architectures in which touch nodes including drive, sense, floating and/or ground electrodes are disposed in a single layer of the touch sensor panels with localized bridge connections to facilitate interconnections. Examples of the disclosure are also directed to various touch node designs of different shapes, including a square touch node design and multiple rectangular touch node designs. In some examples, the touch sensor panel can be composed of a mix of square touch nodes and various rectangular touch nodes. The disclosed touch node designs of different shapes can improve the touch linearity performance of the touch sensor panels.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates (e.g., touch electrodes) made of materials such as Indium Tin Oxide (ITO), conductive polymers, metal mesh, nanowires or nanotubes, and some touch screens can be formed by at least partially integrating touch sensing circuitry into a display pixel stackup (i.e., the stacked material layers forming the display pixels). Examples of the disclosure are directed to various single layer touch sensor panel architectures in which touch nodes including drive, sense, floating and/or ground electrodes are disposed in a single layer of the touch sensor panels with localized bridge connections to facilitate interconnections. It is also to be understood that for the purposes of this disclosure, a single layer touch panel can be made of one or more conductive layers with a thin layer of dielectric separating the conductive layers (e.g., with no substrate separating the conductive layers from one another). The dielectric layer separating the different conductive layers of the touch sensor panel can be different than a substrate in that the dielectric layer can be unable to provide mechanical support/integrity to the layers of the touch sensor panel if it were freestanding, without a substrate (which can provide mechanical support/integrity to the layers of the touch sensor panel) upon which the layers of the touch sensor panel described herein can be disposed. Examples of the disclosure are also directed to various touch node designs of different shapes, including a square touch node design and multiple rectangular touch node designs. In some examples, the touch sensor panel can be composed of a mix of square touch nodes and various rectangular touch nodes. The disclosed touch node designs of different shapes can improve the touch linearity performance of the touch sensor panels.

Figure 1A:
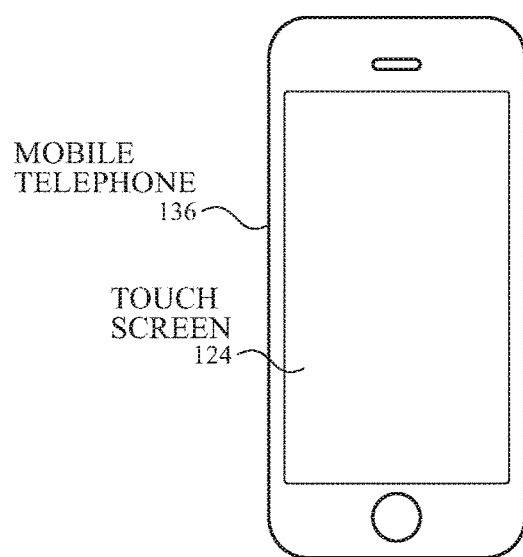
FIGS. 1A-1D illustrate an example mobile telephone, an example media player, an example personal computer and an example tablet computer that can each include an exemplary touch screen according to examples of the disclosure.
Figure 1B:
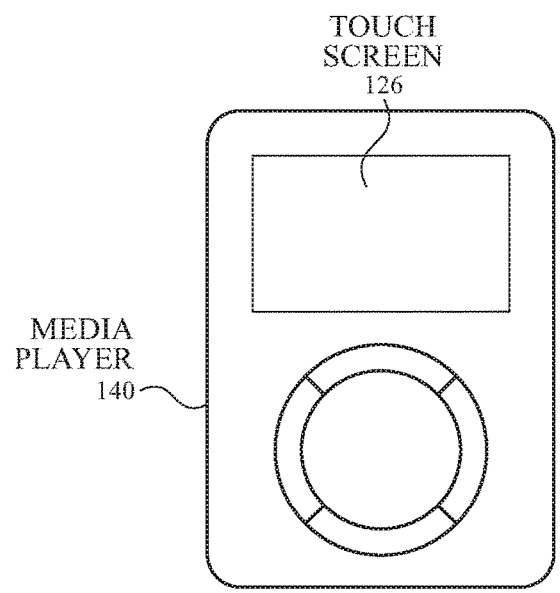
Figure 1C:
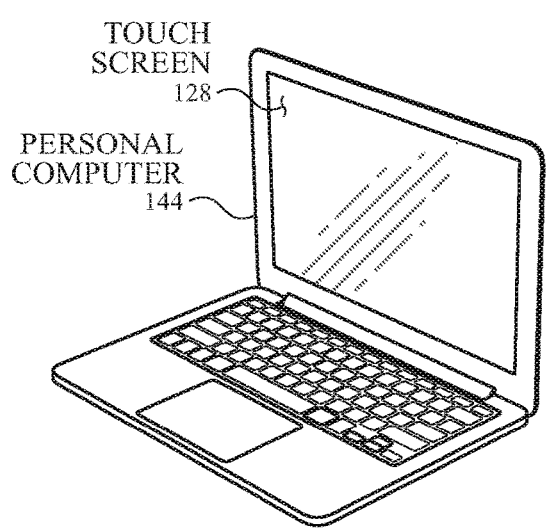
Figure 1D:
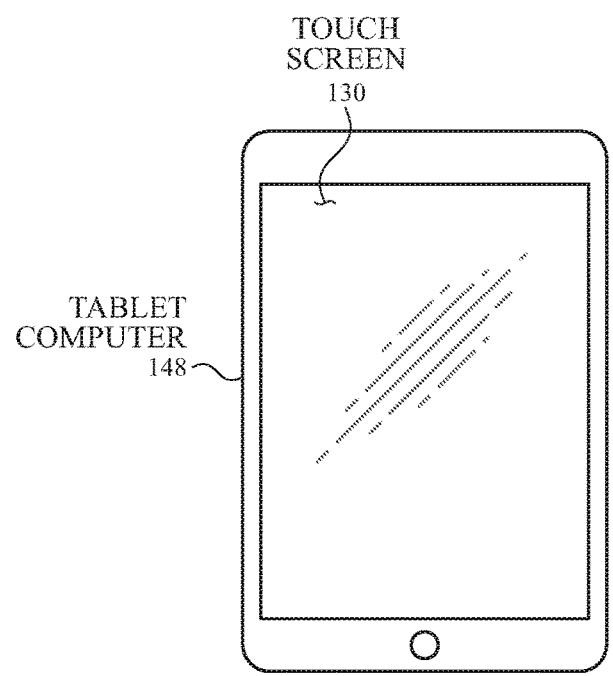

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. In such examples, each touch node electrode can be individually coupled to sense circuitry (circuitry that will be described later) via individual traces. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
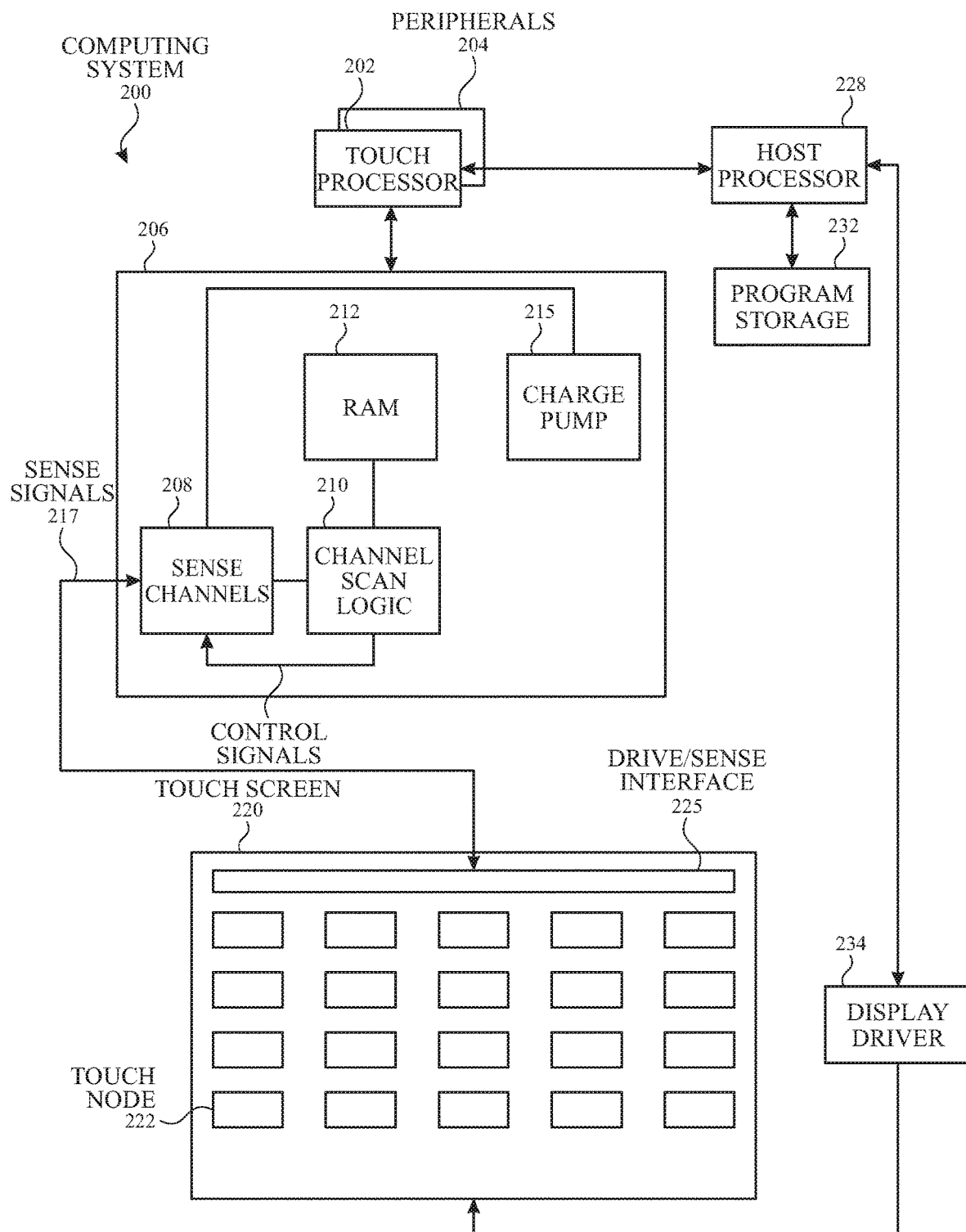
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In some examples, RAM 212 can contain various configuration information for specific touch screen 220 scans performed by channel scan logic 210 (e.g., scan specific configuration information for sense channels 208), can receive and/or store touch data from sense channels 208, and can be managed by channel scan logic 210. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. In some examples, drive/sense interface 225 can be implemented in the touch controller 206, or can be implemented in a chip separate from touch controller 206. Additional exemplary details of how drive/sense interface 225 can be implemented can be found in U.S. patent application Ser. No. 15/009,774, filed Jan. 28, 2016, entitled "Flexible Self Capacitance and Mutual Capacitance Touch Sensing System Architecture," the entire contents of which is hereby incorporated by reference for all purposes. Labeling the conductive plates used to detect touch (i.e., touch node electrodes 222) as "touch node" electrodes (or "touch pixels") can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as display driver 234 (e.g., an LCD display driver or an LED display driver or OLED display driver). The display driver 234 can provide voltages on select (e.g., gate) lines to each pixel transistor and can provide data signals along data lines to these same transistors to control the pixel display image as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing. It is understood that in some examples, touch screen 220 need not be integrated in a display module or stackup (e.g., need not be in-cell), but can instead be separate from the display module or stackup (e.g., a discrete touch sensor panel that is not part of a display, and is merely overlaid on the display or is separate from the display).

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
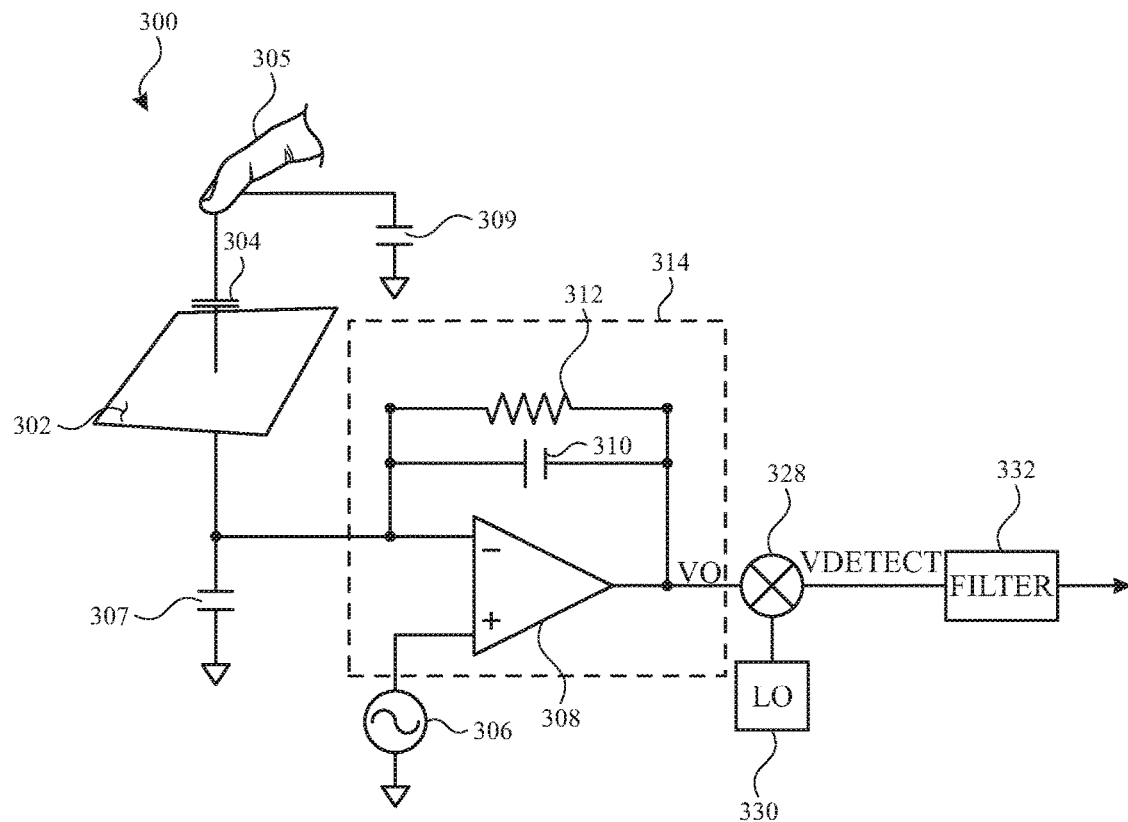
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance Cstray 307 to ground associated with it, and also an additional self-capacitance C 304 to ground that is formed when an object, such as finger 305, is in proximity to or touching the electrode. The total self-capacitance to ground of touch node electrode 302 can be illustrated as capacitance C 304+Cstray 307. Finger 305 can have capacitance Cbody 309 to ground. Note that Cbody 309 can typically be much larger than C 304 such that the total series capacitance of C 304 and Cbody 3097 can be approximately C 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. As such, touch sensor circuit 300 can be configured to sense changes in the total self-capacitance 304 of the touch node electrode 302 induced by a finger or object either touching or in proximity to the touch sensor panel. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred; for example, the DC portion of Vdetect can be used by a processor to determine the presence of a proximity or touch event, or the output can be inputted into a discrete logic network to determine the presence of a proximity or touch event. Note that while FIG. 3A indicates the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Figure 3B:
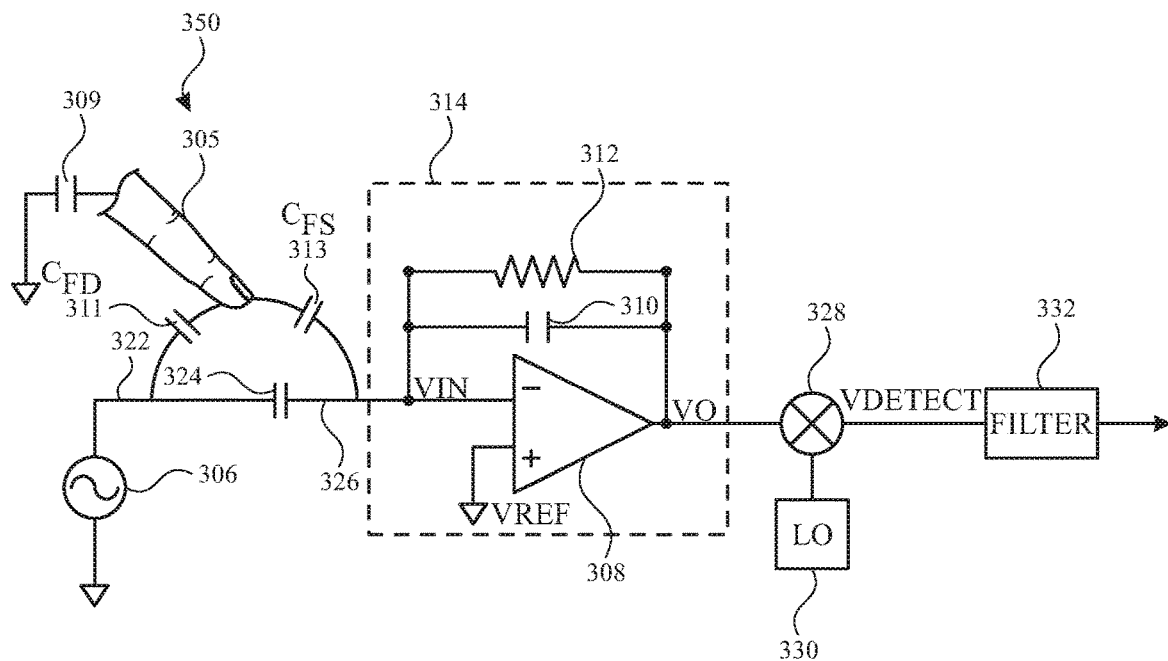
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered as indicated by capacitances $C_{FD}$ 311 and $C_{FS}$ 313, which can be formed between drive line 322, finger 305 and sense line 326. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIG. 3B indicates the demodulation at multiplier 328 occurs in the analog domain, output Vo may be digitized by an ADC, and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
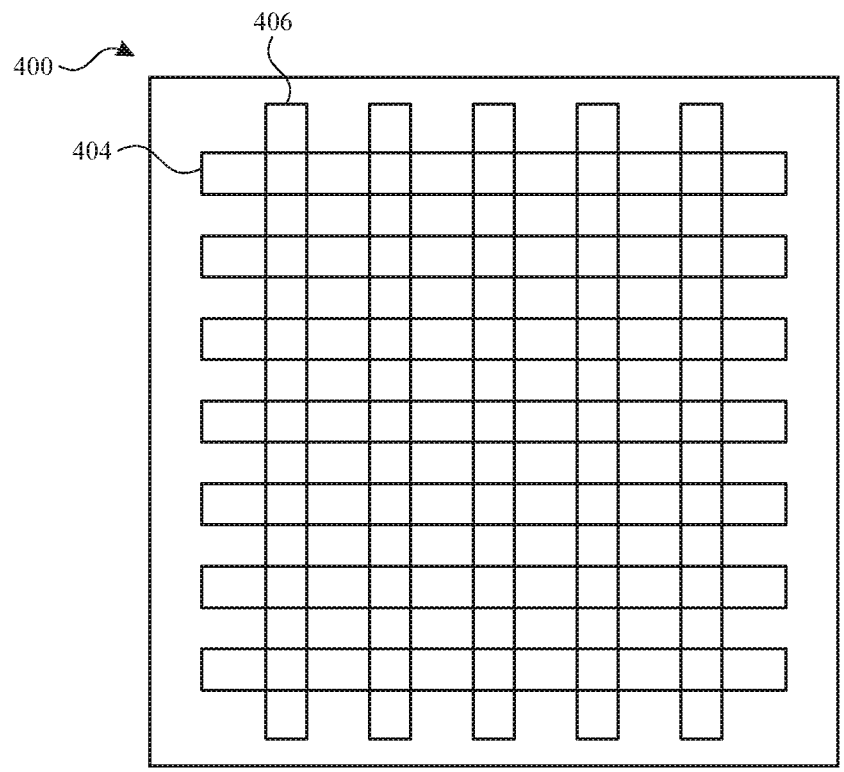
FIG. 4 illustrates a touch screen with sense lines arranged in rows and drive lines arranged in columns according to examples of the disclosure.

FIG. 4 illustrates touch screen 400 with drive lines 406 and sense lines 404 arranged in rows and columns, respectively, according to examples of the disclosure. In some examples, sense lines can be arranged in columns and drive lines can be arranged in rows. Specifically, touch screen 400 can include one or more touch electrodes disposed as columns that form drive lines (e.g., single contiguous electrodes, or noncontiguous electrodes electrically coupled together using electrical bridges), and one or more touch electrodes disposed as rows that form sense lines (e.g., single contiguous electrodes, or noncontiguous electrodes electrically coupled together using electrical bridges). The touch electrodes can be on the same or different material layers on touch screen 400, and the drive lines 406 and the sense lines 404 and can intersect with each other while remaining electrically isolated from each other, as illustrated in FIG. 4. In some examples, touch screen 400 can sense the self-capacitance of lines 404 and 406 to detect touch and/or proximity activity on touch screen 400, and in some examples, touch screen 400 can sense the mutual capacitance between lines 404 and 406 to detect touch and/or proximity activity on touch screen 400.

In touch sensor panels, touch linearity can be a desirable characteristic. Touch linearity can refer to the uniformity of touch signals across various touch nodes (e.g., "touch pixels") formed across the touch sensor panel. Touch sensor panels composed of square touch nodes can have symmetrical drive and sense electrodes and can have good touch linearity performance. However, due to the shape and the size of a touch sensor panel, touch nodes along the edges of the touch sensor panel may have to be truncated prematurely to fit within the form factor of the touch sensor panel, thus forming rectangular touch nodes. This truncation may lead to non-symmetrical drive and/or sense electrodes in touch nodes along the edges of the touch sensor panels, causing poor touch linearity performance along such regions. For a touch sensor panel composed of a variety of touch node shapes, touch linearity can be achieved by a variety of factors, including by keeping the areas dedicated to each of the drive electrodes forming a given touch node close to each other and/or by keeping the areas dedicated to each of the sense electrodes forming the given touch node close to each other (e.g., equal or substantially equal to each other, such as within 10% of each other). In some examples, linearity can be achieved (or improved) when the center of the drive and sense electrodes of the touch node is at the geometrical center of the touch node. In some examples, linearity can be achieved even when the center of the drive and sense electrodes of the touch node is at a point other than its geometrical center. In some examples, linearity can be achieved with a symmetrical distribution of sense, drive, ground and/or floating regions/areas in a touch node. In some examples, linearity can be achieved even with a non-symmetrical distribution of sense, drive, ground and/or floating regions in a touch node. In some examples, linearity can be achieved in a touch node with non-symmetrical sense electrodes by keeping the area of the non-symmetrical sense electrodes close to each other (e.g., equal or substantially equal to each other, such as within 10% of each other). In some examples, linearity can be achieved in a touch node with non-symmetrical drive electrodes by keeping the area of the non-symmetrical drive electrodes close to each other (e.g., equal or substantially equal to each other, such as within 10% of each other). For example, different touch node shapes with different distributions of sense, drive, ground and/or floating regions are described with respect to FIGS. 5-10.

Figure 5:
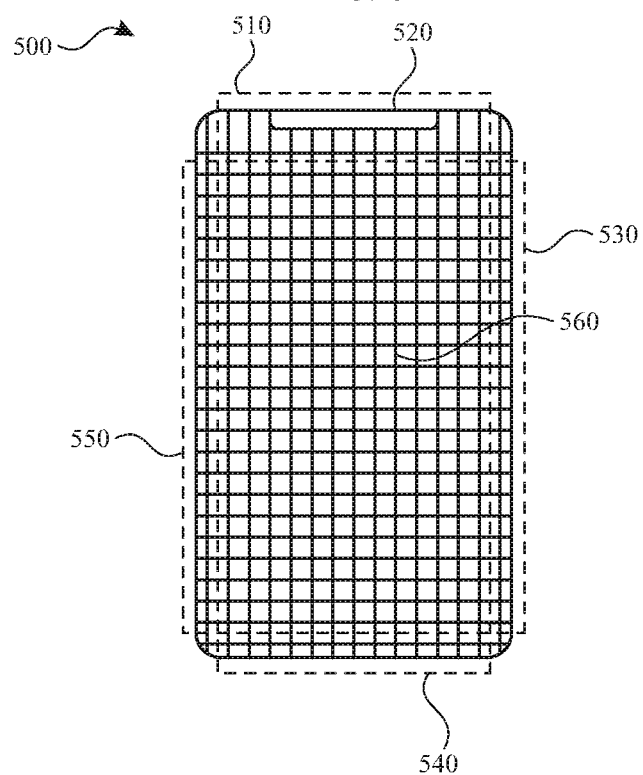
FIG. 5 illustrates an exemplary metal mesh touch panel design with square touch nodes in a central region and rectangular touch nodes in edge regions according to examples of the disclosure.
Figure 6A:
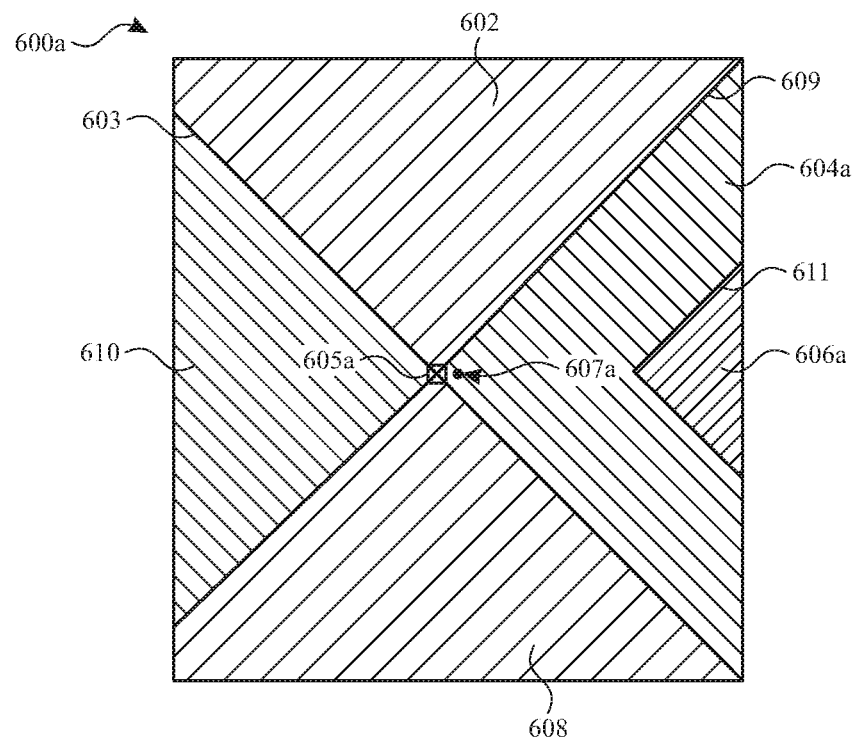
FIGS. 6A-6D illustrate an exemplary square touch node design and exemplary rectangular touch node designs according to examples of the disclosure.
Figure 6B:
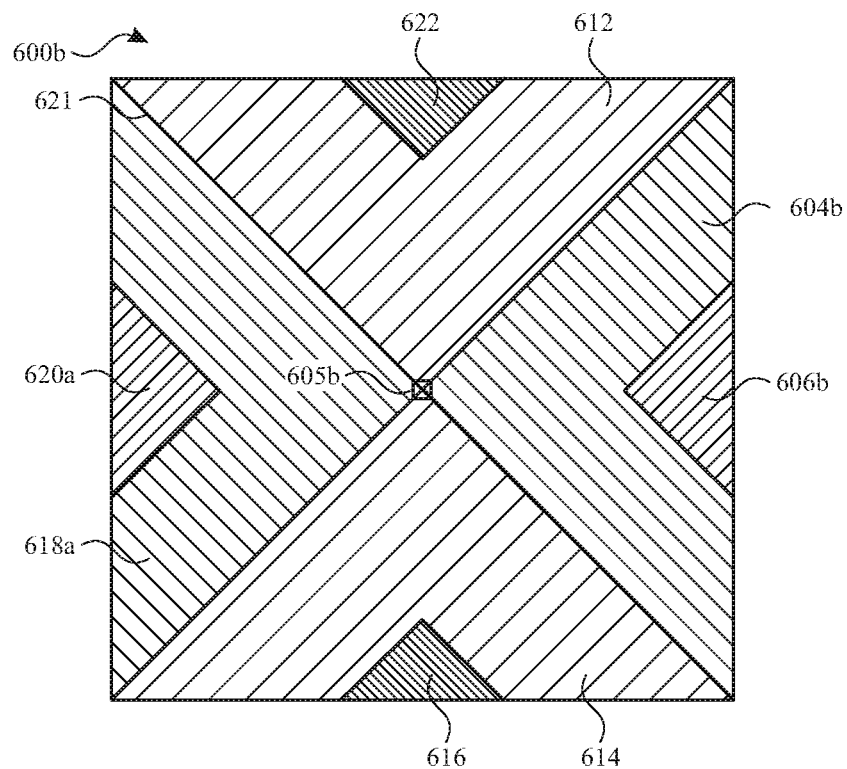
Figure 6C:
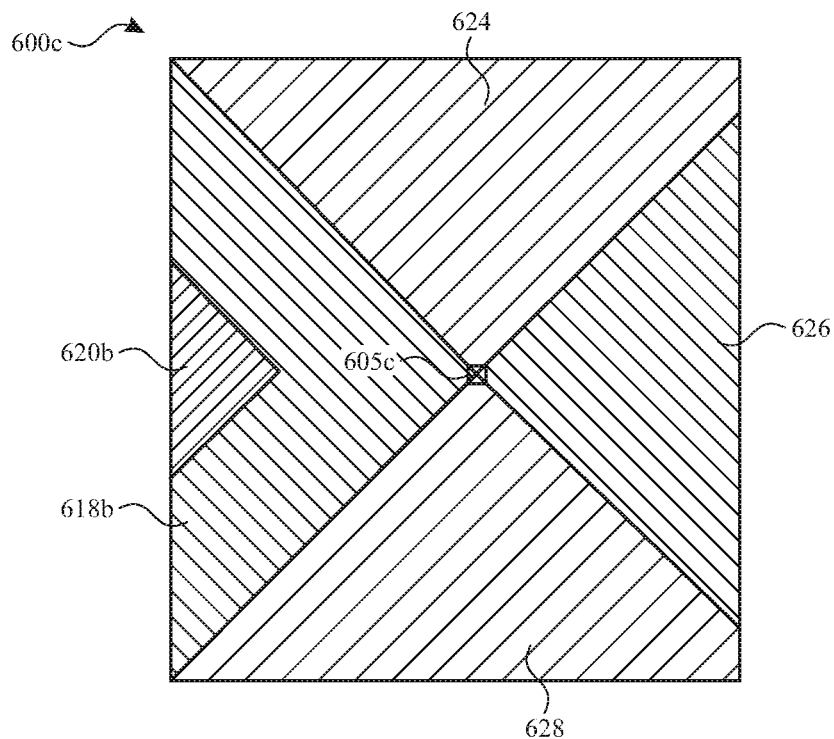
Figure 6D:
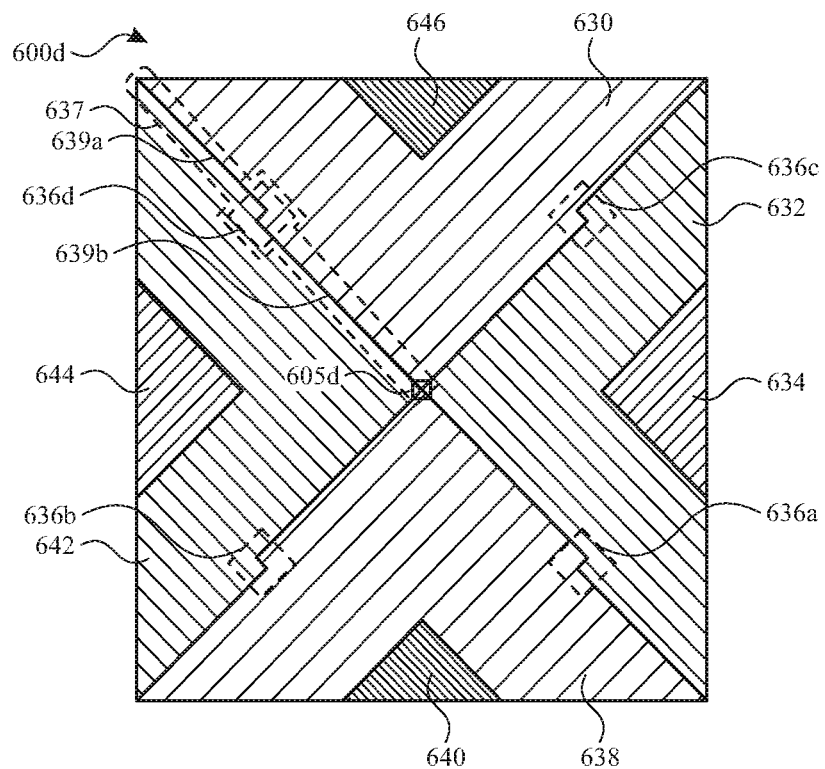

FIG. 5 illustrates an exemplary metal mesh touch panel design with square touch nodes in a central region and rectangular touch nodes in edge regions according to examples of the disclosure. It is to be understood that a touch node of the disclosure can be composed of one or more drive electrodes, one or more sense electrodes, one or more ground electrodes and/or one or more floating electrodes. In some examples, a ground or a floating electrode can be embedded inside a drive electrode (e.g., the ground or floating electrodes can be regions of conductive material positioned within a larger drive electrode, and resistively isolated from the drive electrode, such as due to cuts or electrical discontinuities in the wires making up the metal mesh drive electrode, for example). In some examples, a ground or a floating electrode can be embedded inside a sense electrode (e.g., the ground or floating electrodes can be regions of conductive material positioned within a larger sense electrode, and resistively isolated from the sense electrode, such as due to cuts or electrical discontinuities in the wires making up the metal mesh sense electrode, for example). In some examples, the drive or sense electrode is formed of a first material (e.g., metal mesh) in a first material layer (e.g., the material layer of the metal mesh), and the ground or floating electrode included within it is also formed of the first material (e.g., metal mesh) and in that same first material layer. In some examples, drive electrodes can include ground electrodes and sense electrodes can include floating electrodes. In other examples, drive electrodes can include floating electrodes and sense electrodes can include ground electrodes. In some examples, these electrodes can be formed of metal mesh, while in other examples, these electrodes can be formed of other conductive materials/films (e.g., ITO or other electrical conductors, transparent or otherwise). In some examples, touch sensor panels can be composed entirely of square touch nodes. However, as explained above, in some examples, due to the shape and the size of a touch sensor panel, touch nodes along the edges of the touch sensor panel may have to be truncated prematurely to fit within the form factor of the touch sensor panel, thus forming rectangular touch nodes. For example, touch nodes on the left and the right edges of the touch sensor panel may have to be truncated such that they have a smaller width but the same height as compared to the square touch nodes forming the central region. In some examples, touch nodes on the top and the bottom edges of the touch sensor panel may have to be truncated such that they have a smaller height but the same width as compared to the square touch nodes forming the central region. Specifically, in configuration 500 of FIG. 5, edge regions 510, 530, 540 and 550 can be composed of rectangular touch nodes and central region 560 can be composed of square touch nodes (it is understood that the touch sensor panel of the disclosure can include fewer or more touch nodes than those illustrated in FIG. 5). In some examples, the touch sensor panel of the disclosure can also include a notch. For example, in FIG. 5, the touch sensor panel can include a notch 520 (e.g., an area of the touch sensor panel with no touch nodes). In some examples, the touch sensor panel can be composed of square touch nodes in edge regions 510, 530, 540 and 550 and central region 560. In some examples, the touch sensor panel can be composed of rectangular touch nodes in edge regions 510, 530, 540 and 550 and central region 560. In some examples, the touch sensor panel can be composed of any combination of rectangular touch nodes and square touch nodes in edge regions 510, 530, 540 and 550 and central region 560. In some examples, square touch nodes can be implemented in the form as shown in FIG. 6*b*. In some examples, rectangular touch nodes can be implemented in different forms, such as shown in FIGS. 6*a*, 6*c* and 6*d*. In some examples, a rectangular touch node can have a longer X pitch as compared to Y pitch. In some examples, a rectangular touch node can have a longer Y pitch as compared to X pitch. "Touch node" as used herein can refer to an area of the touch sensor panel at the intersection of a drive line and a sense line. These touch nodes at the plurality of intersections of the plurality of drive lines and the plurality of sense lines can be distributed across the touch sensor panel in an array/matrix distribution (e.g., an x- and y-axis matrix of touch nodes). A given touch node can have a length along the X-axis equal to a longest portion, along the X-axis axis, of drive electrodes included in the given touch node, and can have a length along the Y-axis equal to a longest portion, along the Y-axis, of sense electrodes included in the given touch node (or vice versa in the case that the drive electrodes are arranged horizontally as drive lines, and the sense electrodes are arranged vertically as sense lines).

FIGS. 6*a*-6*d* illustrate an exemplary square touch node design and exemplary rectangular touch node designs according to examples of the disclosure. Specifically, FIG. 6*b* illustrates a square touch node design and FIGS. 6*a*, 6*c* and 6*d* illustrate rectangular touch node designs. As explained above, a touch sensor panel can be composed of a mix of these square and rectangular touch nodes. Each square or rectangular touch node can be composed of one or more (e.g., pairs of) drive electrodes, one or more (e.g., pairs of) sense electrodes, one or more ground electrodes and/or one or more floating electrodes. Specifically, sense electrodes of the touch nodes disposed as rows can be connected together to form sense lines (e.g., single contiguous electrodes, or noncontiguous electrodes electrically coupled together using electrical bridges), such as sense lines 404 shown in FIG. 4. In some examples, drive electrodes of the touch nodes disposed as columns can be connected together to form drive lines (e.g., single contiguous electrodes, or noncontiguous electrodes electrically coupled together using electrical bridges), such as drive lines 406 shown in FIG. 4. In some examples, a sense line 404 (or 326 as referenced in FIG. 3B) can be tied to sense circuitry as shown in FIG. 3B. In some examples, a drive line 406 (or 322 as referenced in FIG. 3B) can be tied to drive circuitry as shown in FIG. 3B. In some examples, floating electrodes can be kept floating (e.g., at high impedance, or uncoupled from any voltage source). In some examples, ground electrodes can be coupled to an outside reference voltage (e.g., reference voltage circuitry) such as ground (or other reference voltage) thereby grounding all the electrodes connected (or keeping all those electrodes at the reference voltage).

For example, FIG. 6a illustrates an exemplary rectangular touch node design according to examples of the disclosure. Specifically, in configuration 600a of FIG. 6a, a rectangular touch node can be composed of drive electrodes 602 and 608, sense electrodes 604a and 610 and a floating electrode 606a. In some examples, drive electrodes share boundaries with sense electrodes, ground and/or floating electrodes. In some examples, sense electrodes share boundaries with drive electrodes, ground and/or floating electrodes. For example, in FIG. 6a, drive electrode 602 shares boundary 603 with sense electrode 610, drive electrodes 602 shares boundary 609 with sense electrode 604a and floating electrode 606a shares boundary 611 with sense electrode 604a. In some examples, these boundaries can be merely discontinuities in connecting metal mesh materials or cuts in metal mesh materials (in the case of metal mesh structures), small gaps in conductive films such as metal or ITO (in the case of conductive film structures), or any other electrical barrier (e.g., a barrier material) between the various electrodes of the disclosure. In some examples, these boundaries can be created at specific angles with respect to the X or Y axis. For examples, in FIG. 6a, all the boundaries are optionally 45 degrees with respect to the X or Y axis.

In some examples, the center of the drive and sense electrodes of the touch node (e.g., the location at which the two drive electrodes and the two sense electrodes of the touch node meet) is optionally not at the geometrical center of the touch node. For example, in FIG. 6a, the center of the drive electrodes 602 and 608 and sense electrodes 604a and 610 can be at 605a, which is optionally not the geometric center of the rectangular touch node 607a. In some examples, there can be a non-symmetrical distribution of sense, drive, ground and/or floating electrodes in a rectangular touch node. For example, in FIG. 6a, the rectangular touch node can be composed of non-symmetrical sense electrodes 604a and 610. In some examples, the non-symmetrical sense or drive electrodes in a rectangular touch node can be caused by a premature truncation of an otherwise square touch node (such as shown in FIG. 6b) disposed on an edge of the touch sensor panel. In some examples, as a result of the premature truncation, the boundary between the drive and sense electrodes disposed close to an edge of the touch sensor panel may not intersect with the corners of the truncated touch node, but may rather intersect with an edge of the touch node. For example, in FIG. 6a, boundary 603 of the rectangular touch node shown in configuration 600a optionally does not intersect with one of the left corners of the rectangular touch node, but rather optionally intersects with the left edge of the rectangular touch node. In some examples, linearity of touch can be achieved by keeping the area of the two non-symmetrical sense electrodes close to each other (e.g., the magnitude of the surface area of sense electrode 610 can be within a threshold amount, such as 10%, of the magnitude of the surface area of sense electrode 604a). In some examples, the area of the two non-symmetrical sense electrodes can be kept close to each other by including a floating or ground electrode within one sense electrode (e.g., a floating or grounded conductive region in the same material layer as the sense electrode, positioned within the sense electrode and resistively isolated from it) and not including a floating or ground electrode within the other sense electrode (e.g., not cutting out a region of the sense electrode for use as a floating or ground electrode). This is because a floating or ground electrode can be positioned within a sense electrode and can reduce the effective/active area of the sense electrode (e.g., the two-dimensional surface area of the sense electrode that is sensitive to touch during touch sensing) by occupying an area that would otherwise form a part of the sense electrode area. For example, in FIG. 6a, the rectangular touch node may include a floating electrode 606a positioned within a sense electrode 604a and may not include a floating electrode positioned within a sense electrode 610 to keep the areas of sense electrodes 604a and 610 close to each other to achieve linearity of touch sensing. In some examples, the area of the two non-symmetrical sense electrodes can be kept close to each other by including a floating or ground electrode of a first size in one sense electrode and including a floating or ground electrode of a second size, different from the first size in the other sense electrode. As explained above, this is possible because a floating or ground electrode reduces the effective/active area of a sense electrode in which it is embedded. In some examples, the rectangular touch node can be composed of non-symmetrical drive electrodes. In some examples, linearity of touch can be achieved by keeping the area of the two non-symmetrical drive electrodes close to each other (e.g., the magnitude of the surface area of drive electrode 602 can be within a threshold amount, such as 10%, of the magnitude of the surface area of drive electrode 608). In some examples, the area of the two non-symmetrical drive electrodes can be kept close to each other by including a floating or ground electrode in one drive electrode and not including a floating or ground electrode in the other drive electrode. In some examples, the area of the two non-symmetrical drive electrodes can be kept close to each other by including a floating or ground electrode of a first size in one drive electrode and including a floating or ground electrode of a second size, different from the first size in the other drive electrode. As explained above, this is possible because a floating or ground electrode reduces the effective/active area of a drive electrode (e.g., the two-dimensional surface area of the drive electrode that is driven with the drive signal used for touch sensing during touch sensing) in which it is embedded. In some examples, multiple rectangular touch nodes of configuration 600a can be distributed vertically on the touch sensor panel. In some examples, left edge of a touch sensor panel can be composed of multiple rectangular touch nodes of configuration 600a distributed vertically on the touch sensor panel. For example, edge region 550 of the touch sensor panel shown in configuration 500 can be composed of multiple rectangular touch nodes of configuration 600a distributed vertically on the touch sensor panel. In some examples, a touch sensor panel can include a rectangular touch node of configuration 600a placed adjacent to a square touch node, such as one shown in FIG. 6b.

FIG. 6b illustrates an exemplary square touch node design according to examples of the disclosure. Specifically, in configuration 600b of FIG. 6b, a square touch node can be composed of drive electrodes 612 and 614, sense electrodes 604b and 618a, floating electrodes 606b and 620a and ground electrodes 616 and 622. As explained above with respect to FIG. 6a, drive electrodes share boundaries with sense electrodes, ground and/or floating electrodes and sense electrodes share boundaries with drive electrodes, ground and/or floating electrodes. In some examples, the center of the drive electrodes and the sense electrodes (e.g., the location at which the two drive electrodes and the two sense electrodes meet) can be at the geometric center of the square touch node. For example, in FIG. 6b, the center of the drive electrodes 612 and 614 and the sense electrodes 604b and 618a can be at 605b, which is optionally also the geometric center of the square touch node. In some examples, there can, therefore, be a symmetrical distribution of sense, drive, ground and/or floating electrodes in a touch node. For example, in FIG. 6b, the square touch node can be composed of symmetrical drive electrodes 612 and 614, sense electrodes 604b and 618a, floating electrodes 606b and 620a and ground electrodes 616 and 622 (e.g., ground electrodes 616 and 622 can have the same size and shape (e.g., within 10% of the same two-dimensional surface area and/or having the same shape/outline and optionally oriented (e.g., rotated) in the same manner with respect to a reference point)). In some examples, linearity of touch can be achieved by a symmetrical distribution of sense, drive, ground and/or floating electrodes in a touch node. In some examples, the area of the symmetrical sense electrodes of the square touch node can be kept close to each other by including floating or ground electrodes of the same size in both the similarly sized sense electrodes (e.g., the magnitude of the surface area of sense electrode 604b can be within a threshold amount, such as 10%, of the magnitude of the surface area of sense electrode 618a). For example, in FIG. 6b, the square touch node may include floating electrode 606b within sense electrode 604b and floating electrode 620a of the same size and shape (e.g., within 10% of the same two-dimensional surface area and/or having the same shape/outline and optionally oriented (e.g., rotated) in the same manner with respect to a reference point) as the floating electrode 606b within sense electrode 618a to keep the areas of sense electrodes 604b and 618a close to each other to achieve (or improve) linearity of touch sensing.

In some examples, the area of the symmetrical drive electrodes of the square touch node can be kept close to each other by including floating or ground electrodes of the same size in both the drive electrodes. For example, in FIG. 6b, the square touch node may include ground electrode 622 within drive electrode 612 and ground electrode 616 of the same size as the ground electrode 622 within drive electrode 614 to keep the areas of drive electrodes 612 and 614 close to each other to achieve linearity of touch sensing. In some examples, multiple square touch nodes of configuration 600b can be placed next to each other. For example, a square touch node of configuration 600b can be placed at the top/bottom/left/right of another square touch node of configuration 600b. In some examples, central region of a touch sensor panel can be composed of multiple square touch nodes of configuration 600b placed next to each other. For example, central region 560 of the touch sensor panel shown in configuration 500 can be composed of multiple square touch nodes of configuration 600b placed next to each other. In some examples, the entire area of a touch sensor panel can be composed of multiple square touch nodes of configuration 600b placed next to each other. For example, central region 560 and edge regions 510, 530, 540 and 550 of the touch sensor panel shown in configuration 500 can be composed of multiple square touch nodes of configuration 600b placed next to each other. In some examples, a rectangular touch node of configuration 600a can be placed at the left edge of a square touch node of configuration 600b.

In some examples, a rectangular touch node of configuration 600a can have a smaller width but the same height as compared to the square touch node of configuration 600b. As explained above, this can be because the rectangular touch node of configuration 600a disposed on the left edge of the touch sensor panel may have to be truncated. Additionally, for example, because the left side of the rectangular touch node of configuration 600a may be truncated, left sense electrode 610 of rectangular touch node of configuration 600a is optionally truncated, resulting in a different shape as compared to the shape of the left sense electrode 618a of square touch node of configuration 600b. Additionally, for example, because the left side of the rectangular touch node of configuration 600a may be truncated, drive electrodes 602 and 608 of rectangular touch node of configuration 600a are optionally truncated, resulting in a different shape as compared to the shape of the drive electrodes 612 and 614 of square touch node of configuration 600b. Additionally, for example, because the right side of the rectangular touch node of configuration 600a may not be truncated, sense electrode 604a of rectangular touch node of configuration 600a is optionally not truncated, resulting in the same shape as compared to the shape of the sense electrode 604b of square touch node of configuration 600b. As explained above, in some examples, in order to maintain touch linearity performance, the area of a sense/drive electrode of a non-symmetrical truncated rectangular touch node can be made to be close to the area of a corresponding sense/drive electrode of a symmetrical square touch node by altering the size of or by completely removing a floating/ground electrode embedded inside the sense/drive electrode of the non-symmetrical truncated rectangular touch node. For example, the truncated sense electrode 610 in FIG. 6a may not include a floating electrode, whereas sense electrode 618a of FIG. 6b optionally does include a floating electrode 620a, resulting in the area of sense electrode 610 optionally close to (e.g., within a threshold amount of, such as 10%) sense electrode 618a. For example, the truncated drive electrodes 602 and 608 in FIG. 6a may not include ground electrodes, whereas drive electrodes 612 and 614 of FIG. 6b optionally do include floating electrodes 622 and 616, resulting in the area of drive electrodes 602 and 608 optionally close to (e.g., within a threshold amount of, such as 10%) drive electrodes 612 and 614 respectively. In some examples, a touch sensor panel can include a square touch node of configuration 600b placed adjacent to a rectangular touch node, such as one shown in FIG. 6c.

FIG. 6c illustrates an exemplary rectangular touch node design according to examples of the disclosure. Specifically, in configuration 600c of FIG. 6c, a rectangular touch node can be composed of drive electrodes 624 and 628, sense electrodes 618b and 626 and a floating electrode 620b. In some examples, multiple rectangular touch nodes of configuration 600c can be distributed vertically on the touch sensor panel. In some examples, right edge of a touch sensor panel can be composed of multiple rectangular touch nodes of configuration 600c distributed vertically on the touch sensor panel. For example, edge region 530 of the touch sensor panel shown in configuration 500 can be composed of multiple rectangular touch nodes of configuration 600*c* distributed vertically on the touch sensor panel. In some examples, a rectangular touch node of configuration 600*c* can be placed at the right edge of a square touch node of configuration 600*b*. In some examples, a rectangular touch node of configuration 600*c* can have a smaller width but the same height as compared to the square touch node of configuration 600*b*. As explained above, this can be because the rectangular touch node of configuration 600*a* disposed on the right edge of the touch sensor panel may have to be truncated. As such, in some examples, the rectangular touch node design of FIG. 6*c* can be a flipped version (e.g., reflected about the Y-axis) of the rectangular touch node design of FIG. 6*a*. Consequently, right-truncated sense electrode 626 of FIG. 6*c* can be a flipped version of left-truncated sense electrode 610 of FIG. 6*a*. Similarly, right-truncated drive electrodes 624 and 628 of FIG. 6*c* can be a flipped version of left-truncated drive electrodes 602 and 608 of FIG. 6*a*. In some examples, sense electrode 618*b* of FIG. 6*c* is a flipped version of sense electrode 604*a* of FIG. 6*a*. As explained with respect to FIG. 6*a*, in FIG. 6*c*, the center of the drive electrodes 624 and 628 and sense electrodes 618*b* and 626 can be at 605*c*, which is optionally not the geometric center of the rectangular touch node. In some examples, as explained with respect to FIG. 6*a*, there can be a non-symmetrical distribution of sense, drive, ground and/or floating electrodes in a touch node. For example, in FIG. 6*c*, the rectangular touch node can be composed of non-symmetrical sense electrodes 618*b* and 626. The linearity of touch performance in the non-symmetrical rectangular touch node of FIG. 6*c* can be achieved in the same manner as can be achieved with respect to the non-symmetrical rectangular touch node of FIG. 6*a*. As such, all the disclosure related to linearity of touch performance with respect to the rectangular touch node of FIG. 6*a* can be applicable to the rectangular touch node of FIG. 6*c*. Additionally, the non-symmetrical rectangular touch node of FIG. 6*c* can differ from the square touch node of FIG. 6*b* in the same manner as the non-symmetrical rectangular touch node of FIG. 6*a* can differ from the square touch node of FIG. 6*b*. As such, all the disclosure related to the comparison of the rectangular touch node of FIG. 6*a* with the square touch node of FIG. 6*b* can be applicable with respect to the rectangular touch node of FIG. 6*c*.

While FIGS. 6*a* and 6*c* show the truncation on the left and the right edges respectively of the square touch node, resulting in left-truncated rectangular touch node (FIG. 6*a*) and right-truncated rectangular touch node (FIG. 6*c*), it is to be understood that the square touch node can be truncated on the top edge or the bottom edge as well, resulting in top-truncated rectangular touch node or bottom truncated rectangular touch node. In some examples, the top-truncated rectangular touch node can look like a rectangular touch node of FIG. 6*a* that has optionally been rotated 90 degrees clockwise. In some examples, the top-truncated rectangular touch node can look like a rectangular touch node of FIG. 6*a* that has optionally been rotated 90 degrees clockwise but the sense electrodes are optionally laid horizontally (in place of drive electrodes) and the drive electrodes are optionally laid vertically (in place of sense electrodes). In some examples, the bottom-truncated rectangular touch node can look like a rectangular touch node of FIG. 6*c* that has optionally been rotated 90 degrees clockwise. In some examples, the bottom-truncated rectangular touch node can look like a rectangular touch node of FIG. 6*c* that has optionally been rotated 90 degrees clockwise but the sense electrodes are optionally laid horizontally (in place of drive electrodes) and the drive electrodes are optionally laid vertically (in place of sense electrodes).

In some examples, a touch sensor panel can include a rectangular touch node with a symmetrical distribution of sense, drive, ground and/or floating electrodes, such as one shown in FIG. 6*d*. FIG. 6*d* illustrates an exemplary rectangular touch node design according to examples of the disclosure. Specifically, in configuration 600*d* of FIG. 6*d*, a rectangular touch node can be composed of drive electrodes 630 and 638, sense electrodes 632 and 642, floating electrodes 634 and 644 and ground electrodes 640 and 646. In some examples, the entire touch sensor panel can be composed of multiple rectangular touch nodes of configuration 600*d*. In some examples, one or more edge regions of the touch sensor panel can be composed of rectangular touch nodes of configuration 600*d* and the central region of the touch sensor panel can be composed of square touch nodes of configuration 600*b*. For example, in FIG. 5, for the touch sensor panel shown in configuration 500, top edge region 510 can be composed of rectangular touch nodes of configuration 600*d*, central region 560 can be composed of square touch nodes of configuration 600*b*, left edge region 550 can be composed of rectangular touch nodes of configuration 600*a* and right edge region 530 can be composed of rectangular touch nodes of configuration 600*c*. In some examples, multiple rectangular touch nodes of configuration 600*d* can be distributed horizontally on the touch sensor panel. In some examples, top edge of a touch sensor panel can be composed of multiple rectangular touch nodes of configuration 600*d* distributed horizontally on the touch sensor panel. For example, edge region 510 of the touch sensor panel shown in configuration 500 can be composed of multiple rectangular touch nodes of configuration 600*d* distributed horizontally on the touch sensor panel.

In some examples, a rectangular touch node of configuration 600*d* can be disposed vertically above a square touch node of configuration 600*b*. In some examples, a rectangular touch node of configuration 600*d* can have a larger height but the same width as compared to the square touch node of configuration 600*b*. Additionally, the boundary 637 between the drive electrode 630 and the sense electrode 642 of the rectangular touch node shown in FIG. 6*d* can correspond to the boundary 621 between the drive electrode 612 and sense electrode 618*a* of the square touch node shown in FIG. 6*b*. In some examples, the center of the drive and the sense electrodes (e.g., the location at which the drive and sense electrodes meet) of the rectangular touch node can be at the geometric center of the rectangular touch node to achieve greater touch linearity performance. For example, in FIG. 6*d*, the center of the drive electrodes 630 and 638 and sense electrodes 632 and 642 can be at 605*d*, which is optionally the geometric center of the rectangular touch node. This can be achieved by redirecting or jogging the boundary between a drive and a sense electrode (e.g., at an angle equal but opposite to the angle of the original boundary). For example, in configuration 600*d* of FIG. 6*d*, the original boundary between drive electrode 630 and sense electrode 642 can be at 45 degrees angle with respect to the X axis. In some examples, the original boundary between drive electrode 630 and sense electrode 642 can be redirected or jogged twice at 90 degrees angle with respect to the original boundary (the redirection or jogging is optionally made at an absolute 45 degrees angle with respect to the X axis) at a specific portion 636*d* along the boundary, so the redirected boundary can also be at 45 degrees angle with respect to X axis. In some examples, such as shown in FIG. 6d, the redirection or jogging of the original boundary can create two straight line segments 639a and 639b forming the boundary between drive electrode 630 and sense electrode 642, each of which can be disposed at a 45 degree angle with respect to the X-axis, with a segment connecting segments 639a and 639b in region 636d which is disposed at a −45 degree angle with respect to the X-axis (e.g., equal but opposite the angle of segments 639a and 639b with respect to the X-axis). In some examples, such as shown in FIG. 6d, the redirection or jogging of the original boundaries can be a technique to extend the rectangular touch node vertically such that the boundaries can intersect with the corners of the rectangular touch node (even though the touch node may not be a square), thus making the drive, sense, floating and/or ground electrodes of the rectangular touch node symmetrical. In some examples, the redirection or jogging of the original boundaries can also ensure that the center of the drive electrodes and the sense electrodes can be at the geometric center of the rectangular touch node such that a symmetrical distribution of sense, drive, ground and/or floating electrodes can be maintained in the rectangular touch node. It is understood that while the example of FIG. 6d illustrates using the jogging techniques of the disclosure to extend the touch node vertically, the jogging techniques of the disclosure can similarly be used to extend the touch node horizontally (e.g., the jogs would be in the opposite direction as shown in FIG. 6d).

A symmetrical distribution of sense, drive, ground and/or floating electrodes can also ensure that the areas of different sense electrodes are close to each other (e.g., within 10% of each other) and the areas of different drive electrodes are close to each other (e.g., within 10% of each other) to achieve good touch linearity performance. For example, in FIG. 6d, drive electrodes 630 and 638 are symmetric with respect to each other and have similar area, sense electrodes 632 and 642 are symmetric with respect to each other and have similar area, floating electrodes 634 and 644 are symmetric with respect to each other and ground electrodes 640 and 646 are symmetric with respect to each other. In some examples, the rectangular touch node can be disposed over one or more display pixels. In some examples, a redirection or jog between the boundary of an adjacent drive electrode and a sense electrode of the rectangular touch node can be made at a specific angle to avoid the possibility that the redirection or jog may cross-over a display pixel to create a visible non-uniformity. For example, in FIG. 6d, redirections or jogs 636a-636d are made at a 45 degree angle with respect to the X axis.

In some examples, the number of redirections or jogs between the original boundary of an adjacent drive electrode and a sense electrode of the rectangular touch node can be at more than one portion of the original boundary, depending on a variety of factors, including redirection or jog pattern visibility and touch linearity performance. For example, the greater the number of redirections or jogs, the more they can be visible over the display pixels. Additionally, a larger redirection or jog at one portion of the original boundary as compared to smaller redirections or jogs at multiple portions of the original boundary can poorly affect touch linearity performance. For example, a rectangular touch node with redirections or jogs at multiple portions of the original boundary between an adjacent drive electrode and a sense electrode is described with respect to FIG. 8a. In some examples, multiple rectangular touch nodes of configuration 600d can be placed next to each other. For example, a rectangular touch node of configuration 600d can be placed at the top/bottom/left/right of another rectangular touch node of configuration 600d. In some examples, a rectangular touch node of configuration 600d can be placed at the top/bottom/left/right of a square touch node of configuration 600b. For example, edge region 510 of the touch sensor panel shown in configuration 500 can be composed of multiple rectangular touch nodes of configuration 600d placed in a row vertically above multiple square touch nodes of configuration 600b. In some examples, multiple rectangular touch nodes of configuration 600d can be vertically below multiple square touch nodes of configuration 600b. In some examples, multiple rectangular touch nodes of configuration 600d can be distributed vertically on the touch sensor panel. In some examples, left edge and/or right edge of a touch sensor panel can be composed of multiple rectangular touch nodes of configuration 600d distributed vertically on the touch sensor panel.

Figure 7:
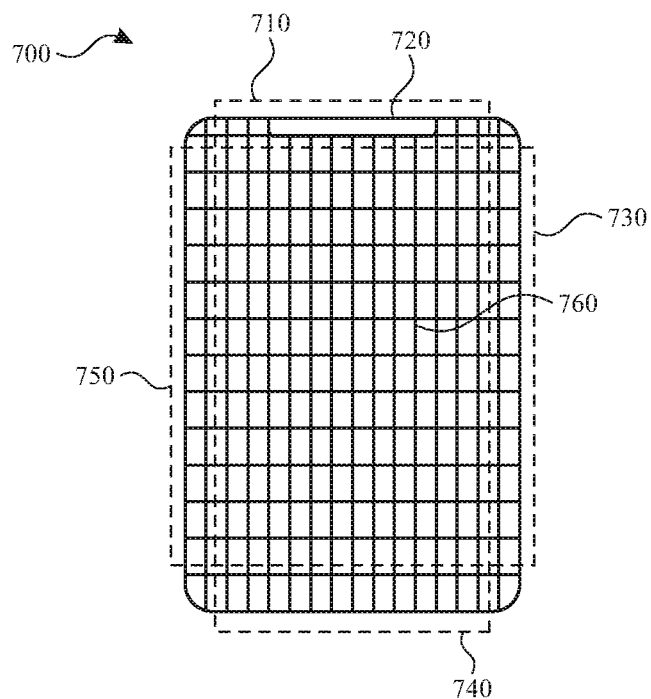
FIG. 7 illustrates an exemplary metal mesh touch panel design with rectangular touch nodes according to examples of the disclosure.

FIG. 7 illustrates an exemplary metal mesh touch panel design with rectangular touch nodes according to examples of the disclosure. In some examples, touch sensor panels can be composed entirely of rectangular touch nodes of one type. In some examples, touch sensor panels can be composed of a mix of rectangular touch nodes of different types. Specifically, in configuration 700 of FIG. 7, edge regions 710, 730, 740 and 750 and central region 760 can be composed entirely of rectangular touch nodes (it is understood that the touch sensor panel of the disclosure can include fewer or more touch nodes than those illustrated in FIG. 7). In some examples, edge region 710 can be composed of rectangular touch nodes of FIG. 8b, edge region 730 can be composed of rectangular touch nodes of FIG. 6c, edge region 740 can be composed of rectangular touch nodes of FIG. 8a, edge region 750 can be composed of rectangular touch nodes of FIG. 6a and central region 760 can be composed of rectangular touch nodes of FIG. 8a. In some examples, the touch sensor panel of the disclosure can also include a notch. For example, in FIG. 7, the touch sensor panel can include a notch 720 (e.g., an area of the touch sensor panel with no touch nodes). In some examples, a rectangular touch node can have a longer X pitch as compared to Y pitch. In some examples, a rectangular touch node can have a longer Y pitch as compared to X pitch.

Figure 8A:
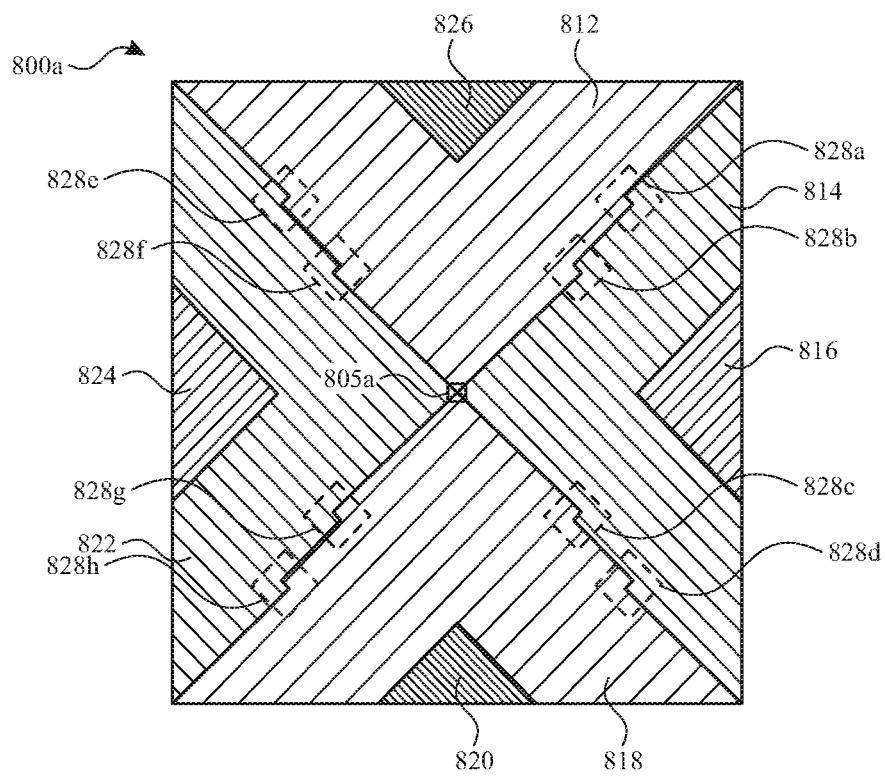
FIGS. 8A and 8B illustrate exemplary rectangular touch node designs according to examples of the disclosure.
Figure 8B:
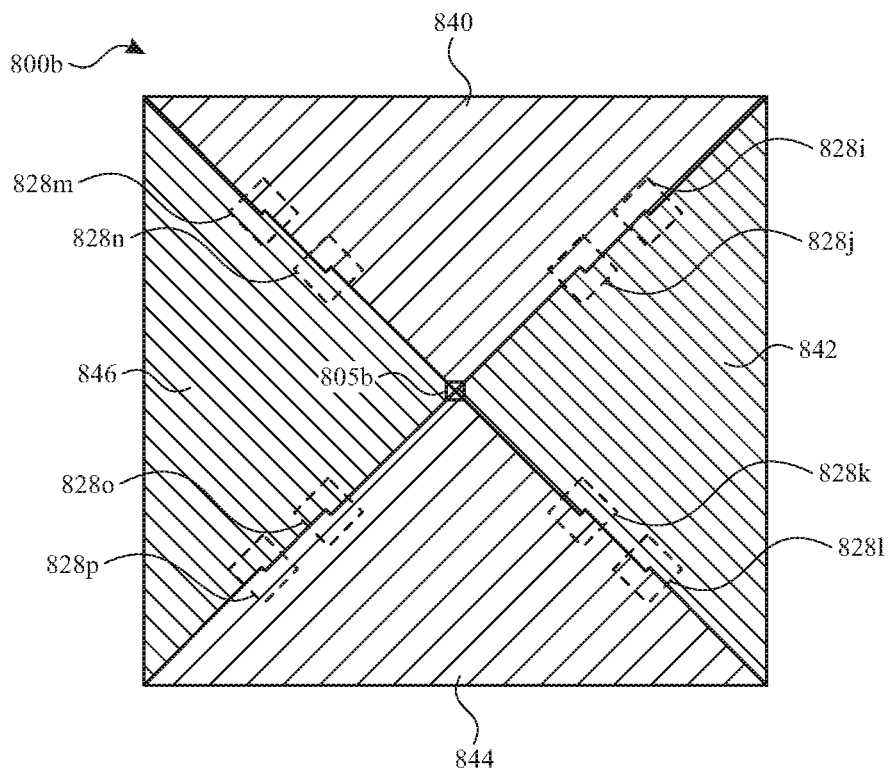

FIGS. 8a and 8b illustrate exemplary rectangular touch node designs according to examples of the disclosure. FIG. 8a illustrates an exemplary rectangular touch node design according to examples of the disclosure. Specifically, in configuration 800a of FIG. 8a, a rectangular touch node can be composed of drive electrodes 812 and 818, sense electrodes 814 and 822, floating electrodes 816 and 824 and ground electrodes 826 and 820 and redirections or jogs at portions 828a-h. The redirections or jogs at portions 828a-h of the rectangular touch node of FIG. 8a can be created in the same manner as the redirections or jogs 636a-d of the rectangular touch node of FIG. 6d. Additionally, the characteristics of the redirections or jogs at portions 828a-h of the rectangular touch node of FIG. 8a can be the same as the characteristics of the redirections or jogs 636a-d of the rectangular touch node of FIG. 6d. In some examples, the rectangular touch node of FIG. 8a can differ from the rectangular touch node of FIG. 6d in that there can be twice as many (or more) redirections or jogs per original boundary between a drive electrode and a sense electrode in a rectangular touch node of FIG. 8a as compared to a rectangular touch node of FIG. 6d. The above disclosure with respect to the comparison between the rectangular touch node of FIG. 6d and the square touch node of FIG. 6b can apply to the comparison between the rectangular touch node of FIG. 8a and the square touch node of FIG. 6b. Additionally, the entire disclosure with respect to the touch linearity performance of the rectangular touch node of FIG. 6d can apply to the rectangular touch node of FIG. 8a. In some examples, the entire touch sensor panel can be composed of multiple rectangular touch nodes of configuration 800a. In some examples, one or more edge regions of the touch sensor panel can be composed of rectangular touch nodes of configuration 800a and the central region of the touch sensor panel can be composed of square touch nodes of configuration 600b.

FIG. 8b illustrates an exemplary rectangular touch node design according to examples of the disclosure. Specifically, in configuration 800b of FIG. 8b, a rectangular touch node can be composed of drive electrodes 840 and 844, sense electrodes 842 and 846 and redirections or jogs at portions 828i-p. The entire disclosure with respect to rectangular touch node of FIG. 8a can apply to the rectangular touch node of FIG. 8b. In some examples, the redirections or jogs at portions 828i-p of the rectangular touch node of FIG. 8b can be created at angles opposite to which the redirections or jogs at portions 828a-h of the rectangular touch node of FIG. 8a were optionally created, thereby optionally making the height of the rectangular touch node of FIG. 8b shorter than its width (the height of the rectangular touch node of FIG. 8a was optionally longer than its width). In some examples, in order to maintain good touch linearity performance, the rectangular touch node of FIG. 8b may not include any floating or ground electrodes, such that the area of the drive and sense electrodes of the rectangular touch node of FIG. 8b can be close to the area of the drive and sense electrodes of the rectangular touch node of FIG. 8a which optionally includes floating electrodes 816 and 824 and ground electrodes 826 and 820. In some examples, the entire touch sensor panel can be composed of multiple rectangular touch nodes of configuration 800b. In some examples, one or more edge regions of the touch sensor panel can be composed of rectangular touch nodes of configuration 800b and the central region of the touch sensor panel can be composed of rectangular touch nodes of configuration 800a or square touch nodes of configuration 600b.

Figure 9:
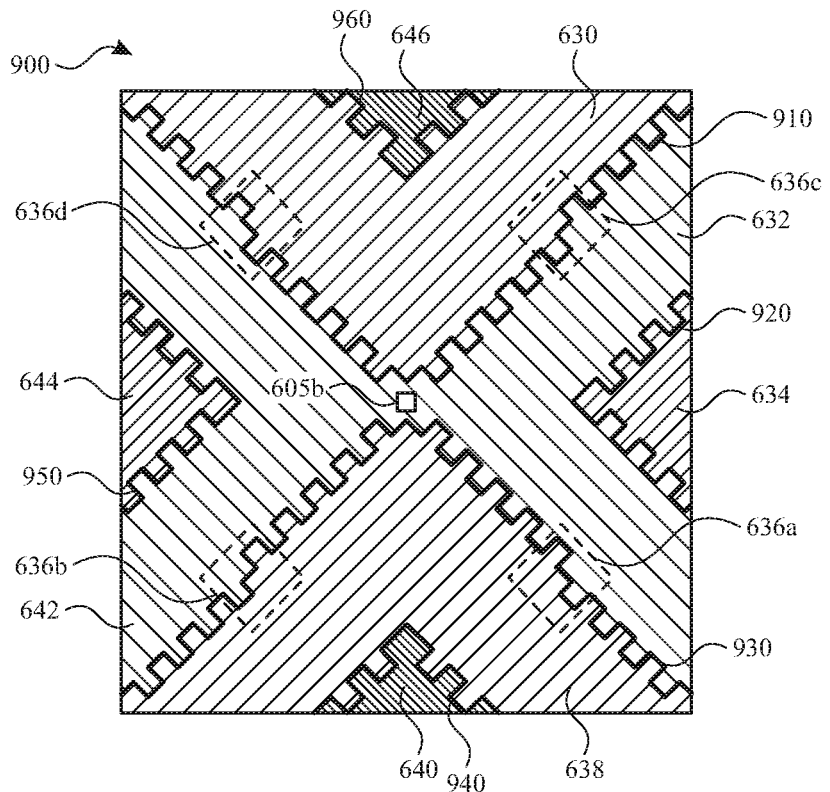
FIG. 9 illustrates an exemplary rectangular touch node design with interleaved boundaries between the drive and the sense electrodes according to examples of the disclosure.

FIG. 9 illustrates an exemplary rectangular touch node design with interleaved boundaries between the drive and the sense electrodes according to examples of the disclosure. Specifically, in configuration 900 of FIG. 9, a rectangular touch node can be composed of drive electrodes 630 and 638, sense electrodes 632 and 642, floating electrodes 634 and 644, ground electrodes 640 and 646 and interleaved boundaries 910, 920, 930, 940, 950 and 960 between different electrodes of the rectangular touch node. The entire disclosure with respect to rectangular touch node of FIG. 6d can apply to the rectangular touch node of FIG. 9. In some examples, the boundaries between different electrodes of the rectangular touch node of FIG. 9 can be interleaved (e.g., as compared to the boundaries between different electrodes of the rectangular touch node of FIG. 6d, which can optionally be straight). In other examples, the boundaries of different electrodes of the rectangular touch nodes of FIG. 6a, 6b, 6c, 8a or 8b can also be interleaved.

Figure 10A:
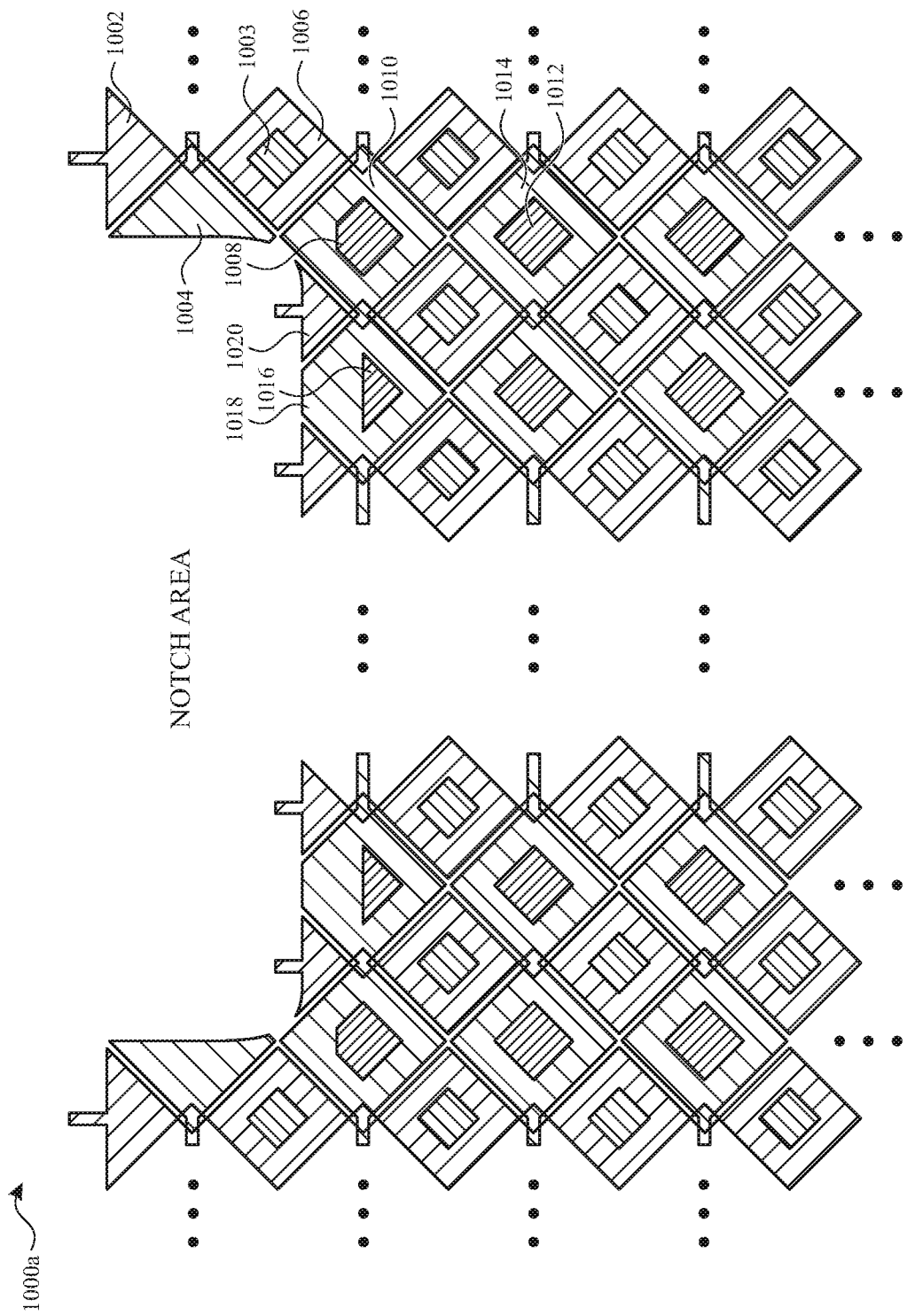
FIG. 10A illustrates an exemplary electrode layout showing a notch region of a touch sensor panel according to examples of the disclosure.

FIG. 10a illustrates an exemplary electrode layout showing a notch region of a touch sensor panel according to examples of the disclosure. Specifically in configuration 1000a of FIG. 10a, the notch region of the touch sensor panel can be composed of sense electrodes 1004, 1010, 1014 and 1018 (e.g., disposed horizontally in rows), drive electrodes 1002, 1006 and 1020 (e.g., disposed vertically in columns), floating electrodes 1008, 1012 and 1016 (e.g., disposed within some sense electrodes) and ground electrodes 1003 (e.g., disposed within some drive electrodes). In some examples, the electrodes around the notch region may be truncated to follow the edges of the notch region. In such cases, as explained above with respect to FIGS. 6a-6d and 8a-8b, the ground or floating electrodes embedded inside the respective drive or sense electrodes may have to be altered in size or completely removed to maintain good touch linearity performance. For example, in FIG. 10a, drive electrodes 1002 and 1020 around the notch region can be truncated as compared to the drive electrode 1006, which is optionally not truncated. Additionally, the truncated drive electrodes 1002 and 1020 around the notch region optionally do not include any ground electrodes as compared to the non-truncated drive electrode 1006, which optionally includes ground electrode 1003 in order to maintain good touch linearity performance. Moreover, the sense electrodes 1004 and 1018 around the notch region can be truncated as compared to the sense electrode 1014, which is optionally not truncated. Additionally, truncated sense electrode 1004 optionally does not include any floating electrode and truncated sense electrode 1018 optionally includes a smaller floating electrode 1016 as compared to the non-truncated sense electrode 1014, which optionally includes a bigger floating electrode 1012 in order to maintain good touch linearity performance. In some examples, a non-truncated drive or sense electrode around the notch region may include a smaller ground or floating electrode as compared to a non-truncated drive or sense electrode away from the notch region in order to maintain good touch linearity performance. For example, in FIG. 10a, non-truncated sense electrode 1010 optionally incudes a smaller floating electrode 1008 as compared to non-truncated sense electrode 1014, which optionally includes a bigger floating electrode 1012 in order to maintain good touch linearity performance (e.g., due to the asymmetrical and/or uneven distribution of drive/sense electrode area at the touch node formed at the intersection of electrodes 1018, 1020 and 1010).

Figure 10B:
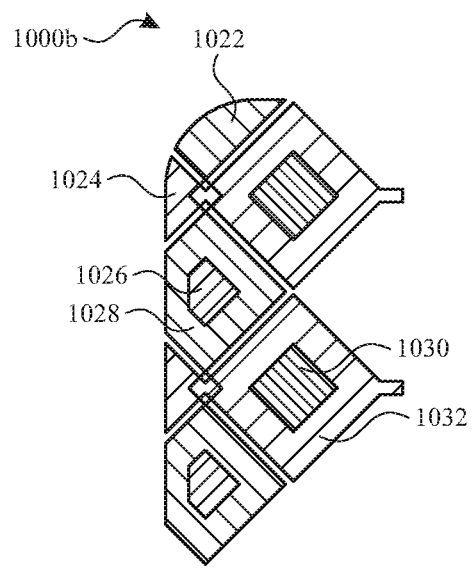
FIG. 10B illustrates an exemplary electrode layout showing a corner region of a touch sensor panel according to examples of the disclosure.

FIG. 10b illustrates an exemplary electrode layout showing a corner region of a touch sensor panel according to examples of the disclosure. Specifically in configuration 1000b of FIG. 10b, the corner region of the touch sensor panel can be composed of sense electrodes 1024 and 1032 (e.g., arranged in rows), drive electrodes 1022 and 1028 (e.g., arranged in columns), floating electrodes 1030 (e.g., disposed within some sense electrodes) and ground electrodes 1026 (e.g., disposed within some drive electrodes). In some examples, the electrodes around the corner region may be truncated to follow the edges of the touch sensor panel. In such cases, as explained above with respect to FIGS. 6a-6d, 8a-8b and 10a, the ground or floating electrodes embedded inside the respective drive or sense electrodes may have to be altered in size or completely removed to maintain good touch linearity performance. For example, in FIG. 10b, drive electrodes 1022 and 1028 around the corner region can be truncated. Additionally, truncated drive electrode 1022 optionally does not include any ground electrode and truncated drive electrode 1028 optionally includes a small ground electrode 1026 (e.g., smaller than a non-truncated drive electrode in the central region 560 or 760 of the touch sensor panel) in order to maintain good touch linearity performance. Moreover, sense electrodes 1024 around the corner region can be truncated as compared to sense electrode 1032, which is optionally not truncated. Additionally, truncated sense electrode 1024 optionally does not include any floating electrode as compared to non-truncated sense electrode 1032, which optionally includes a larger floating electrode 1030 in order to maintain good touch linearity performance.

It is understood that in some situations, it may not be possible to equalize the areas of two sense electrodes or two drive electrodes in a given touch node by reducing the size of, or removing, the ground/floating electrode from one of the sense or drive electrodes (e.g., because the sense or drive electrode at issue may be overlay truncated due to the layout of the edges of the touch sensor panel, such as in a rounded corner or next to a notch area). In such situations, the techniques of this disclosure can be used to reduce the mismatch in areas as much as possible to improve touch linearity, while not necessarily achieving equalization (or substantial equalization).

Thus, the examples of the disclosure provide various configurations for touch sensor panels having mixed-shape touch nodes, and techniques for achieving better touch linearity by varying the size and/or the shape of these electrodes.

Therefore, according to the above, some examples of the disclosure are directed to a touch sensor panel comprising: a plurality of drive electrodes and a plurality of sense electrodes, wherein the plurality of drive electrodes and the plurality of sense electrodes form a plurality of touch nodes, the plurality of touch nodes located where two drive electrodes and two sense electrodes meet, including: a first touch node including a first pair of drive electrodes and a second pair of sense electrodes; and a second touch node including a third pair of drive electrodes and a fourth pair of sense electrodes, wherein: the first touch node is a different size than the second touch node, a first respective pair of electrodes of the first pair and the second pair includes a first electrode and a second electrode, the first electrode having disposed within it a first reference or floating electrode and the second electrode having disposed within it a second reference or floating electrode such that an active area of the first electrode is substantially equal to an active area of the second electrode, wherein a total area of the first reference or floating electrode and the second reference or floating electrode is a first area, and a second respective pair of electrodes of the third pair and the fourth pair of a same electrode type as the first respective pair of electrodes includes a third electrode and a fourth electrode, the third electrode and the fourth electrode having disposed within at least one of the third electrode and the fourth electrode one or more reference or floating electrodes such that an active area of the third electrode is substantially equal to an active area of the fourth electrode, wherein a total area of the one or more reference or floating electrodes is a second area, different than the first area. Additionally or alternatively to the examples disclosed above, in some examples, the first respective pair of electrodes is a pair of drive electrodes, and the second respective pair of electrodes is a pair of drive electrodes. Additionally or alternatively to the examples disclosed above, in some examples, the first respective pair of electrodes is a pair of sense electrodes, and the second respective pair of electrodes is a pair of sense electrodes. Additionally or alternatively to the examples disclosed above, in some examples, a given touch node has a length along a first axis equal to a longest portion, along the first axis, of drive electrodes included in the given touch node, and has a length along a second axis equal to a longest portion, along the second axis, of sense electrodes included in the given touch node. Additionally or alternatively to the examples disclosed above, in some examples, the first reference or floating electrode has an area substantially equal to an area of the second reference or floating electrode. Additionally or alternatively to the examples disclosed above, in some examples, the first reference or floating electrode has a shape substantially the same as a shape of the second reference or floating electrode. Additionally or alternatively to the examples disclosed above, in some examples, the third electrode includes the one or more reference or floating electrodes and the fourth electrode does not include a reference or floating electrode. Additionally or alternatively to the examples disclosed above, in some examples, the third electrode includes a reference or floating electrode having substantially the same area as the first reference or floating electrode, and the fourth electrode includes a reference or floating electrode having a different area than the second reference or floating electrode. Additionally or alternatively to the examples disclosed above, in some examples, the pairs of drive electrodes form contiguous drive lines, and the pairs of sense electrodes form non-contiguous sense lines. Additionally or alternatively to the examples disclosed above, in some examples, the pairs of drive electrodes form non-contiguous drive lines, and the pairs of sense electrodes form contiguous sense lines. Additionally or alternatively to the examples disclosed above, in some examples, the first electrode is formed of a first material in a first material layer, and the first reference or floating electrode is formed of the first material in the first material layer and is electrically isolated from the first electrode. Additionally or alternatively to the examples disclosed above, in some examples, the first touch node is a different size than the second touch node along a first axis, the first touch node has a first boundary between a respective drive electrode and a respective sense electrode in the first touch node, the second touch node has a second boundary between a respective drive electrode and a respective sense electrode in the second touch node, wherein the second boundary corresponds to the first boundary in the first touch node, and the second boundary has a different profile than the first boundary such that the drive electrodes and the sense electrodes of the second touch node are symmetrically disposed with respect to a geometrical center of the second touch node. Additionally or alternatively to the examples disclosed above, in some examples, the first boundary has a straight line profile that is oriented at a first absolute angle with respect to the first axis, and the second boundary comprises a plurality of straight line profiles, each straight line profile of the plurality of straight line profiles oriented at the first absolute angle with respect to the first axis. Additionally or alternatively to the examples disclosed above, in some examples, the first boundary extends from a geometrical center of the first touch node to a first corner of the first touch node, and the second boundary extends from the geometrical center of the second touch node to a second corner of the second touch node, corresponding to the first corner of the first touch node. Additionally or alternatively to the examples disclosed above, in some examples, the first touch node has a square shape, the second touch node has a rectangular shape, and a dimension of the square shape along a first axis is the same as a dimension of the rectangular shape along the first axis. Additionally or alternatively to the examples disclosed above, in some examples, the touch sensor panel includes: a plurality of touch nodes, including the first touch node, having the square shape disposed in a center region of the touch sensor panel; and a plurality of touch nodes, including the second touch node, having the rectangular shape disposed in an edge region of the touch sensor panel.

Some examples of the disclosure are directed to an electronic device comprising: a touch screen comprising: a display; and a touch sensor panel including: a plurality of drive electrodes and a plurality of sense electrodes, wherein the plurality of drive electrodes and the plurality of sense electrodes form a plurality of touch nodes, the plurality of touch nodes located where two drive electrodes and two sense electrodes meet, including: a first touch node including a first pair of drive electrodes and a second pair of sense electrodes; and a second touch node including a third pair of drive electrodes and a fourth pair of sense electrodes, wherein: the first touch node is a different size than the second touch node, a first respective pair of electrodes of the first pair and the second pair includes a first electrode and a second electrode, the first electrode having disposed within it a first reference or floating electrode and the second electrode having disposed within it a second reference or floating electrode such that an active area of the first electrode is substantially equal to an active area of the second electrode, wherein a total area of the first reference or floating electrode and the second reference or floating electrode is a first area, and a second respective pair of electrodes of the third pair and the fourth pair of a same electrode type as the first respective pair of electrodes includes a third electrode and a fourth electrode, the third electrode and the fourth electrode having disposed within at least one of the third electrode and the fourth electrode one or more reference or floating electrodes such that an active area of the third electrode is substantially equal to an active area of the fourth electrode, wherein a total area of the one or more reference or floating electrodes is a second area, different than the first area; and touch circuitry coupled to the plurality of drive electrodes and the plurality of sense electrodes. Additionally or alternatively to the examples disclosed above, in some examples, the third electrode includes the one or more reference or floating electrodes and the fourth electrode does not include a reference or floating electrode. Additionally or alternatively to the examples disclosed above, in some examples, third electrode includes a reference or floating electrode having substantially the same area as the first reference or floating electrode, and the fourth electrode includes a reference or floating electrode having a different area than the second reference or floating electrode. Additionally or alternatively to the examples disclosed above, in some examples, the first touch node is a different size than the second touch node along a first axis, the first touch node has a first boundary between a respective drive electrode and a respective sense electrode in the first touch node, the second touch node has a second boundary between a respective drive electrode and a respective sense electrode in the second touch node, wherein the second boundary corresponds to the first boundary in the first touch node, and the second boundary has a different profile than the first boundary such that the drive electrodes and the sense electrodes of the second touch node are symmetrically disposed with respect to a geometrical center of the second touch node.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A touch sensor panel comprising:
a plurality of drive electrodes and a plurality of sense electrodes, wherein the plurality of drive electrodes and the plurality of sense electrodes form a plurality of touch nodes, the plurality of touch nodes located where two drive electrodes and two sense electrodes meet, including:
a first touch node including a first pair of drive electrodes and a second pair of sense electrodes; and
a second touch node including a third pair of drive electrodes and a fourth pair of sense electrodes,
wherein:
the first touch node is a different size than the second touch node,
the first touch node is disposed in a center region of the touch sensor panel and the second touch node is disposed in an edge region of the touch sensor panel,
a first respective pair of electrodes of the first pair and the second pair includes a first electrode and a second electrode, the first electrode having disposed within it a first reference or floating electrode and the second electrode having disposed within it a second reference or floating electrode such that an active area of the first electrode is substantially equal to an active area of the second electrode, wherein a total area of the first reference or floating electrode and the second reference or floating electrode is a first area, and
a second respective pair of electrodes of the third pair and the fourth pair of a same electrode type as the first respective pair of electrodes includes a third electrode and a fourth electrode, the second respective pair of electrodes having disposed within it one or more reference or floating electrodes including at least a third reference or floating electrode disposed within the third electrode such that an active area of the third electrode is substantially equal to an active area of the fourth electrode, wherein a total area of the one or more reference or floating electrodes is a second area, different than the first area.

2. The touch sensor panel of claim 1, wherein the first respective pair of electrodes is a pair of drive electrodes, and the second respective pair of electrodes is a pair of drive electrodes.

3. The touch sensor panel of claim 1, wherein the first respective pair of electrodes is a pair of sense electrodes, and the second respective pair of electrodes is a pair of sense electrodes.

4. The touch sensor panel of claim 1, wherein a given touch node has a length along a first axis equal to a longest portion, along the first axis, of drive electrodes included in the given touch node, and has a length along a second axis equal to a longest portion, along the second axis, of sense electrodes included in the given touch node.

5. The touch sensor panel of claim 1, wherein the first reference or floating electrode has an area substantially equal to an area of the second reference or floating electrode.

6. The touch sensor panel of claim 5, wherein the first reference or floating electrode has a shape substantially the same as a shape of the second reference or floating electrode.

7. The touch sensor panel of claim 1, wherein the fourth electrode does not include a reference or floating electrode.

8. The touch sensor panel of claim 1, wherein the third reference or floating electrode has substantially the same area as the first reference or floating electrode, and the fourth electrode includes a fourth reference or floating electrode having a different area than the second reference or floating electrode.

9. The touch sensor panel of claim 1, wherein the pairs of drive electrodes form contiguous drive lines, and the pairs of sense electrodes form non-contiguous sense lines.

10. The touch sensor panel of claim 1, wherein the pairs of drive electrodes form non-contiguous drive lines, and the pairs of sense electrodes form contiguous sense lines.

11. The touch sensor panel of claim 1, wherein the first electrode is formed of a first material in a first material layer, and the first reference or floating electrode is formed of the first material in the first material layer and is electrically isolated from the first electrode.

12. The touch sensor panel of claim 1, wherein:
the first touch node is a different size than the second touch node along a first axis,
the first touch node has a first boundary between a respective drive electrode and a respective sense electrode in the first touch node,
the second touch node has a second boundary between a respective drive electrode and a respective sense electrode in the second touch node, wherein the second boundary corresponds to the first boundary in the first touch node, and
the second boundary has a different profile than the first boundary such that the drive electrodes and the sense electrodes of the second touch node are symmetrically disposed with respect to a geometrical center of the second touch node.

13. The touch sensor panel of claim 12, wherein the first boundary has a straight line profile that is oriented at a first absolute angle with respect to the first axis, and the second boundary comprises a plurality of straight line profiles, each straight line profile of the plurality of straight line profiles oriented at the first absolute angle with respect to the first axis.

14. The touch sensor panel of claim 12, wherein the first boundary extends from a geometrical center of the first touch node to a first corner of the first touch node, and the second boundary extends from the geometrical center of the second touch node to a second corner of the second touch node, corresponding to the first corner of the first touch node.

15. The touch sensor panel of claim 1, wherein the first touch node has a square shape, the second touch node has a rectangular shape, and a dimension of the square shape along a first axis is the same as a dimension of the rectangular shape along the first axis.

16. The touch sensor panel of claim 15, wherein the touch sensor panel includes:
a plurality of touch nodes, including the first touch node, having the square shape disposed in the center region of the touch sensor panel; and
a plurality of touch nodes, including the second touch node, having the rectangular shape disposed in the edge region of the touch sensor panel.

17. An electronic device comprising:
a touch screen comprising:
a display; and
a touch sensor panel including:
a plurality of drive electrodes and a plurality of sense electrodes, wherein the plurality of drive electrodes and the plurality of sense electrodes form a plurality of touch nodes, the plurality of touch nodes located where two drive electrodes and two sense electrodes meet, including:
a first touch node including a first pair of drive electrodes and a second pair of sense electrodes; and a second touch node including a third pair of drive electrodes and a fourth pair of sense electrodes,
wherein:
the first touch node is a different size than the second touch node,
the first touch node is disposed in a center region of the touch sensor panel and the second touch node is disposed in an edge region of the touch sensor panel,
a first respective pair of electrodes of the first pair and the second pair includes a first electrode and a second electrode, the first electrode having disposed within it a first reference or floating electrode and the second electrode having disposed within it a second reference or floating electrode such that an active area of the first electrode is substantially equal to an active area of the second electrode, wherein a total area of the first reference or floating electrode and the second reference or floating electrode is a first area, and
a second respective pair of electrodes of the third pair and the fourth pair of a same electrode type as the first respective pair of electrodes includes a third electrode and a fourth electrode, the second respective pair of electrodes having disposed within it one or more reference or floating electrodes including at least a third reference or floating electrode disposed within the third electrode such that an active area of the third electrode is substantially equal to an active area of the fourth electrode, wherein a total area of the one or more reference or floating electrodes is a second area, different than the first area; and
touch circuitry coupled to the plurality of drive electrodes and the plurality of sense electrodes.

18. The electronic device of claim 17, wherein the fourth electrode does not include a reference or floating electrode.

19. The touch sensor panel of claim 17, wherein the third reference or floating electrode has substantially the same area as the first reference or floating electrode, and the fourth electrode includes a fourth reference or floating electrode having a different area than the second reference or floating electrode.

20. The touch sensor panel of claim 17, wherein:
the first touch node is a different size than the second touch node along a first axis,
the first touch node has a first boundary between a respective drive electrode and a respective sense electrode in the first touch node,
the second touch node has a second boundary between a respective drive electrode and a respective sense electrode in the second touch node, wherein the second boundary corresponds to the first boundary in the first touch node, and
the second boundary has a different profile than the first boundary such that the drive electrodes and the sense electrodes of the second touch node are symmetrically disposed with respect to a geometrical center of the second touch node.

* * * * *